US010399620B2

(12) United States Patent
Zhang et al.

(10) Patent No.: US 10,399,620 B2
(45) Date of Patent: Sep. 3, 2019

(54) SPHERICAL ROBOT AND METHOD OF CONTROLLING THE SAME

(71) Applicant: BOE Technology Group Co., Ltd., Beijing (CN)

(72) Inventors: Yifei Zhang, Beijing (CN); Ying Zhang, Beijing (CN); Kai Zhao, Beijing (CN); Hongli Ding, Beijing (CN); Yu Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 129 days.

(21) Appl. No.: 15/566,998

(22) PCT Filed: Mar. 20, 2017

(86) PCT No.: PCT/CN2017/077260
§ 371 (c)(1),
(2) Date: Oct. 16, 2017

(87) PCT Pub. No.: WO2017/193702
PCT Pub. Date: Nov. 16, 2017

(65) Prior Publication Data
US 2018/0288334 A1 Oct. 4, 2018

(30) Foreign Application Priority Data
May 9, 2016 (CN) .......................... 2016 1 0302645

(51) Int. Cl.
*B62D 57/00* (2006.01)
*B62D 57/02* (2006.01)
(Continued)

(52) U.S. Cl.
CPC .............. *B62D 57/00* (2013.01); *B60R 11/04* (2013.01); *B62D 11/02* (2013.01); *B62D 57/02* (2013.01);
(Continued)

(58) Field of Classification Search
CPC .......... B62D 57/00; B62D 57/02; B60B 19/14
See application file for complete search history.

(56) References Cited

U.S. PATENT DOCUMENTS 9,968,864 B2 *  5/2018  Clarke ................. G05D 1/0225
2018/0043952 A1 *  2/2018  Ellerman ................. B60K 1/00

FOREIGN PATENT DOCUMENTS

CN          101229832 A     7/2008
CN          101314222 A    12/2008
(Continued)

OTHER PUBLICATIONS

International Search Report and Written Opinions, and English Translation of International Search Report and Box V of Written Opinion from International Patent Application No. PCT/CN2017/077260 dated Jun. 8, 2017, 17 pages.
(Continued)

*Primary Examiner* — Kevin Hurley
(74) *Attorney, Agent, or Firm* — Westman, Champlin & Koehler, P.A.

(57) ABSTRACT

The present disclosure relates to the field of robot technology, and discloses a spherical robot and a method of controlling the same. The spherical robot includes: a spherical shell, a spherical shell drive mechanism mounted inside the spherical shell to drive the spherical shell to spin about a center of sphere thereof, and a camera module. The spherical robot further includes a head shell in which the camera module is mounted, the head shell is located outside the spherical shell and is slideable along an outer surface of the spherical shell; and, the head shell is provided with a first magnetic component, the spherical shell drive mechanism is provided with a second magnetic component, and the first magnetic component is in a magnetic connection with the second magnetic component.

16 Claims, 7 Drawing Sheets

(51) Int. Cl.
*B60R 11/04* (2006.01)
*B62D 11/02* (2006.01)
*H04N 5/225* (2006.01)
*B60B 19/14* (2006.01)
*B64G 1/16* (2006.01)
*B60R 11/00* (2006.01)
*B64G 1/10* (2006.01)

(52) U.S. Cl.
CPC ............ *H04N 5/2252* (2013.01); *B60B 19/14* (2013.01); *B60R 2011/004* (2013.01); *B60R 2011/0092* (2013.01); *B60Y 2200/40* (2013.01); *B64G 1/16* (2013.01); *B64G 2001/1071* (2013.01)

(56) References Cited

FOREIGN PATENT DOCUMENTS

| | | |
|---|---|---|
| CN | 201670289 U | 12/2010 |
| CN | 203825464 U | 9/2014 |
| CN | 105292289 A | 2/2016 |
| CN | 105564523 A | 5/2016 |
| CN | 105947006 A | 9/2016 |
| CN | 205615604 U | 10/2016 |
| JP | H11114234 A | 4/1999 |
| JP | 2003-305671 A | 10/2003 |
| JP | 2004306921 A | 11/2004 |

OTHER PUBLICATIONS

First Office Action, including Search Report, for Chinese Patent Application No. 201610302645.X, dated Aug. 31, 2017, 5 pages.

* cited by examiner

SPHERICAL ROBOT AND METHOD OF CONTROLLING THE SAME

CROSS-REFERENCE TO RELATED APPLICATION

This application is a 371 National Stage application of International Application No. PCT/CN2017/077260, filed on Mar. 20, 2017, which has not yet published, and which claims priority to Chinese Patent Application (of which the patent application number is No. 201610302645.X) filed on May 9, 2016 in the State Intellectual Property Office of China, the disclosures of which are hereby incorporated by reference in their entirety.

TECHNICAL FIELD

The present disclosure relates to the field of robot technology, and particularly, to a spherical robot and a method of controlling the same.

BACKGROUND

A spherical robot is a robot which comprises a driving system, sensors, controllers and the likes installed inside a spherical shell, and the robot's omnidirectional motions, including its forward motion, backward motion and steering and the like, are achieved by driving the spherical shell to roll in an inner driving manner. Because the spherical robot has a closed shell and special form of motion, it owns better dynamic and static balances compared to wheeled or rail-mounted robots and humanoid robot. Accordingly, the spherical robot is not easy to come into an instable condition because of collision, and can go back to a maximum stable condition after being instable. In addition, the spherical robot has good terrain adaptability and good sealing property, which can make it run in harsh environments such as the dusty, moisture, corrosive environments.

Therefore, a spherical robot equipped with image recording equipment can be used in terrain detection, exploration of extraterrestrial planets, explorations in radioactive and corrosive environments and other fields, and thus the spherical robot has a wide range of applications and a huge market prospect. In most of conventional spherical robot systems, camera is arranged inside the spherical shell so that the camera will not bring any impact on motion of the spherical robot. Moreover, the spherical shell is designed to be transparent so that the camera can observe external environment to achieve image recording function. However, due to this arrangement of the camera, mechanical structure design of the spherical robot is much complex, and the angle of view of the camera is low and the camera is prone to be blocked. In addition, degree of clarity of the image is restricted by degree of transparency of a material for the spherical shell. While, because of high requirement on material for the spherical shell, the spherical robot is costly and thus is not suitable for market promotion. Accordingly, it is particularly urgent to design a spherical robot with better image recording effect.

SUMMARY

According to one aspect of the present disclosure, there is provided a spherical robot, comprising: a spherical shell, a spherical shell drive mechanism mounted inside the spherical shell to drive the spherical shell to spin about a center of sphere thereof, and a camera module; wherein, the spherical robot further comprises a head shell in which the camera module is mounted, the head shell is located outside the spherical shell and is slideable along an outer surface of the spherical shell; and, the head shell is provided with a first magnetic component, the spherical shell drive mechanism is provided with a second magnetic component, and the first magnetic component is in a magnetic connection with the second magnetic component.

In some embodiments, in a vertical direction, a gravity center of an assembly including the spherical shell drive mechanism, the head shell and the camera module is lower than the center of sphere of the spherical shell.

In some embodiments, the spherical shell drive mechanism comprises a chassis, a plurality of Mecanum wheels provided on the chassis and rollably fitted with an inner surface of the spherical shell, a first controller configured to control motions of the Mecanum wheels, and a first power module configured to power the Mecanum wheels and the first controller, wherein, the chassis is provided with a connecting arm, and the second magnetic component is provided at one end of the connecting arm.

In some embodiments, the connecting arm comprises a first connecting rod and a second connecting rod, wherein: one end of the first connecting rod is mounted on the chassis, and a first driving unit is provided between the first connecting rod and the chassis and is configured to drive motion of the first connecting rod; one end of the second connecting rod is connected to the other end of the first connecting rod, a second driving unit is provided between the second connecting rod and the first connecting rod and is configured to drive motion of the second connecting rod relative to the first connecting rod, and the second magnetic component is provided at the other end of the second connecting rod; and the first driving unit and the second driving unit are in signal connections with the first controller, and are connected to the first power module.

In some embodiments, the first driving unit is an electric motor, and/or the second driving unit is an electric motor.

In some embodiments, the chassis has a quadrilateral structure, four corners of the chassis are provided with a first Mecanum wheel, a second Mecanum wheel, a third Mecanum wheel and a fourth Mecanum wheel, respectively; in a forward direction of the spherical robot, the first Mecanum wheel and the fourth Mecanum wheel are located at a left side of the chassis, the second Mecanum wheel and the third Mecanum wheel are located at a right side of the chassis, the first Mecanum wheel is located in the front of the fourth Mecanum wheel, and the second Mecanum wheel is located in the front of the third Mecanum wheel; a rotation axis of the first Mecanum wheel is parallel to a rotation axis of the fourth Mecanum wheel, and a shaft axis of the second Mecanum wheel is parallel to a shaft axis of the third Mecanum wheel; the rotation axis of the first Mecanum wheel is perpendicular to the forward direction of the spherical robot and forms an angle of 5°~15° with respect to a vertical direction; the shaft axis of the second Mecanum wheel is perpendicular to the forward direction of the spherical robot and forms an angle of 5°~15° with respect to the vertical direction; and, a distance between the first Mecanum wheel and the second Mecanum wheel is gradually increased in a vertically downward direction.

In some embodiments, each of the Mecanum wheels is connected with the chassis by an electric motor which is in a signal connection with the first controller and is electrically connected to the first power module.

In some embodiments, the first power module is a rechargeable battery.

In some embodiments, during sliding of the head shell along the outer surface of the spherical shell, when the head shell is pitching relative to the spherical shell, an angle between a vertical direction and a connection line between a center of the head shell and the center of sphere of the spherical shell is in the range from 0° to 45°.

In some embodiments, the head shell is supported on the outer surface of the spherical shell by a plurality of universal wheels.

In some embodiments, the head shell is provided with four universal wheels distributed in a quadrangle shape.

In some embodiments, the camera module comprises a camera, a second controller being in a signal connection with the camera, and a second power module electrically connected to the camera and the second controller and configured to power the camera and the second controller.

In some embodiments, the second power module is a rechargeable battery.

According to another aspect of the present disclosure, there is provided a method of controlling a spherical robot, and the method comprises:

S501, driving the spherical shell to spin by controlling the spherical shell drive mechanism, such that, the head shell slides along the outer surface of the spherical shell under the action of cooperation between the first magnetic component and the second magnetic component; and S502, controlling the camera module provided in the head shell, to implement image recording.

In some embodiments, in a case that, the chassis has a quadrilateral structure, four corners of the chassis are provided with a first Mecanum wheel, a second Mecanum wheel, a third Mecanum wheel and a fourth Mecanum wheel, respectively, and that in a forward direction of the spherical robot, the first Mecanum wheel and the fourth Mecanum wheel are located at a left side of the chassis, the second Mecanum wheel and the third Mecanum wheel are located at a right side of the chassis, the first Mecanum wheel is located in the front of the fourth Mecanum wheel, and the second Mecanum wheel is located in the front of the third Mecanum wheel, the driving the spherical shell to spin by controlling the spherical shell drive mechanism comprises:

driving the spherical robot to move forward when the first Mecanum wheel, the second Mecanum wheel, the third Mecanum wheel and the fourth Mecanum wheel rotate about their own rotation axes in a first direction;

driving the spherical robot to move backward when the first Mecanum wheel, the second Mecanum wheel, the third Mecanum wheel and the fourth Mecanum wheel rotate about their own rotation axes in a second direction opposing to the first direction;

driving the spherical robot to move rightward when the first Mecanum wheel and the third Mecanum wheel rotate about their own rotation axes in the first direction while the second Mecanum wheel and the fourth Mecanum wheel rotate about their own rotation axes in the second direction;

driving the spherical robot to move leftward when the first Mecanum wheel and the third Mecanum wheel rotate about their own rotation axes in the second direction while the second Mecanum wheel and the fourth Mecanum wheel rotate about their own rotation axes in the first direction;

driving the spherical robot to rotate clockwise when the first Mecanum wheel and the fourth Mecanum wheel rotate about their own rotation axes in the first direction while the second Mecanum wheel and the third Mecanum wheel rotate about their own rotation axes in the second direction;

driving the spherical robot to rotate counterclockwise when the first Mecanum wheel and the fourth Mecanum wheel rotate about their own rotation axes in the second direction while the second Mecanum wheel and the third Mecanum wheel rotate about their own rotation axes in the first direction;

driving the spherical robot to move rightward and forward when the first Mecanum wheel and the third Mecanum wheel rotate about their own rotation axes in the first direction while the second Mecanum wheel and the fourth Mecanum wheel implement no rotation; and driving the spherical robot to move leftward and forward when the second Mecanum wheel and the fourth Mecanum wheel rotate about their own rotation axes in the first direction while the first Mecanum wheel and the third Mecanum wheel implement no rotation.

In some embodiments, in a case that the spherical shell drive mechanism comprises a chassis and a connecting arm provided on the chassis and including a first connecting rod and a second connecting rod, a process of sliding of the head shell along the outer surface of the spherical shell comprises:

driving the head shell to implement a pitch-down motion when the second magnetic component is driven by the first connecting rod and the second connecting rod to move towards a moving direction of the spherical robot; and driving the head shell to implement a pitch-up motion when the second magnetic component is driven by the first connecting rod and the second connecting rod to move towards a direction opposing to the moving direction of the spherical robot.

DETAILED DESCRIPTION OF THE EMBODIMENTS

Technique solutions of embodiments of the present disclosure will be further described hereinafter in detail and completely with reference to the attached drawings. Obviously, the described embodiments are only some of embodiments of the present disclosure, instead of all of the embodiments of the present disclosure. For those skilled in the art, other embodiments achieved by referring to the following embodiments without involving any inventive steps fall into the scope of the present disclosure.

Figure 1:
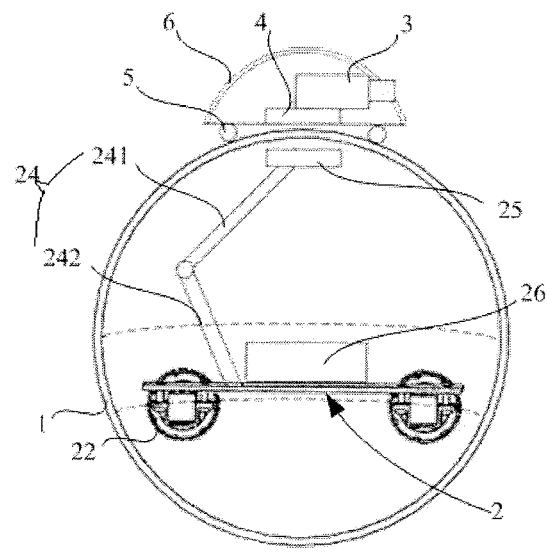
FIG. 1 is a schematic view showing a structure of a spherical robot according to an embodiment of the present disclosure.
Figure 2:
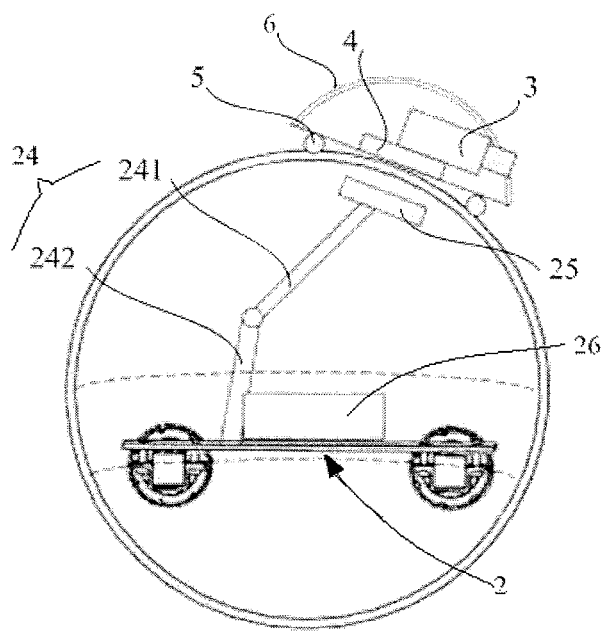
FIG. 2 is a schematic view showing a structure of the spherical robot according to the embodiment of the present disclosure, when a head shell of the spherical robot is sliding relative to a spherical shell.

Referring to FIG. 1 and FIG. 2, a spherical robot according to an embodiment of the present disclosure comprises: a spherical shell 1, a spherical shell drive mechanism 2 mounted inside the spherical shell 1 to drive the spherical shell 1 to spin about a center of sphere thereof, and a camera module 3. The spherical robot further comprises a head shell 6 in which the camera module 3 is mounted, the head shell 6 is located outside the spherical shell 1 and is slideable along an outer surface of the spherical shell 1. The head shell 6 is provided with a first magnetic component 4, the spherical shell drive mechanism 2 is provided with a second magnetic component 25, and the first magnetic component 4 is in a magnetic connection with the second magnetic component 25. In a vertical direction, gravity center of an assembly including the spherical shell drive mechanism 2, the head shell 6 and the camera module 3 is lower than the center of sphere of the spherical shell 1.

In the above spherical robot, when the spherical shell drive mechanism 2 drives the spherical shell 1 to spin about the center of sphere thereof, the spherical robot walks. Meanwhile, the second magnetic component 25 mounted on the spherical shell drive mechanism 2 has a motion correspondingly. Moreover, the magnetic connection between the first magnetic component 4 provided on the head shell 6 and the second magnetic component 25 achieves a relatively fixed positional relationship between the head shell 6 and the spherical shell drive mechanism 2, to slide the head shell 6 along the outer surface of the spherical shell 1. When the spherical robot walks, the head shell 6 is driven to have a motion correspondingly, and thus the camera module 3 is driven to have a motion. Therefore, flexible motion of the camera module 3 can be achieved by a relatively simple structure of the above spherical robot. Moreover, since the camera module 3 is located outside the spherical shell 1, sharpness of its image is not affected by the spherical shell 1, and the camera module 3 has a wide view angle and is not prone to be blocked when taking an image, thereby enhancing image recording effect of the camera module 3.

In one embodiment, in order to ensure that the head shell 6 is always kept at the top of the spherical shell 1, in the vertical direction, gravity center of an assembly including the spherical shell drive mechanism 2, the head shell 6 and the camera module 3 is lower than the center of sphere of the spherical shell 1.

Since the gravity center of the assembly including the spherical shell drive mechanism 2, the head shell 6 and the camera module 3 is lower than the center of sphere of the spherical shell 1 in the vertical direction, the head shell 6, under the action of the first magnetic component 4 and the second magnetic component 25, is always kept on the top of the spherical shell 1 and won't fall. The assembly including the spherical shell drive mechanism 2, the head shell 6 and the camera module 3 has an unchangeable position in the vertical direction relative to a motion plane of the spherical robot. When the spherical shell 1 spins about the center of sphere thereof, the head shell 6 has a motion correspondingly on the top of the spherical shell 1. It owns good stableness and can guarantee overall balance of the spherical robot.

In order to achieve a better control on motion of the spherical robot, in one embodiment, referring to FIG. 1, FIG. 2, FIG. 3 and FIG. 4, the spherical shell drive mechanism 2 comprises a chassis 21, a plurality of Mecanum wheels 22 provided on the chassis 21 and rollably fitted with an inner surface of the spherical shell 1, a first controller 262 configured to control motions of the Mecanum wheels 22, and a first power module 261 configured to power the Mecanum wheels 22 and the first controller 262. The chassis 21 is provided with a connecting arm 24, and the second magnetic component 25 is provided at one end of the connecting arm 24. The connecting arm 24 is in a signal connection with the first controller 262, and is electrically connected with the first power module 261. Specifically, the signal connection between the connecting arm and the first controller may be a wireless connection, a wired connection and the like.

The Mecanum wheel 22 is an omnidirectionally mobile wheel which is based on conventional wheel and has several freely rotatable rollers mounted on the rim of the wheel in a direction forming an angle of 45° with an axis of the wheel. When the wheel rolls, the rollers implement lateral motions. By combination use and control of the Mecanum wheels, a motion mechanism which is based on the Mecanum wheels 22 can implement movements and rotations in any directions within the plane of motion, and can achieve flexible motion within narrow space.

Regarding the above spherical shell drive mechanism 2, when the first controller 262 sends a motion signal to corresponding Mecanum wheel(s) 22 and the connecting arm 24 according to operative signal which is sent by an external remote controller and is received by the first controller 262, the Mecanum wheel(s) 22 and the connecting arm 24 implement corresponding motions according to the received motion signal, with the support of the power of the first power module 261.

Once receiving a motion signal, due to rolling fits between the Mecanum wheels 22 provided on the chassis 21 and the inner surface of the spherical shell 1, the Mecanum wheels 22 cooperate to drive the chassis 21 to move in a certain direction, so as to drive the spherical shell 1 to spin about its center of sphere. While, the connecting arm 24 provided on the chassis 21 drives the second magnetic component 25 to move in the certain direction, so that the second magnetic component 25 drives the first magnetic component 4 being in the magnetic connection therewith to move, to move the head shell 6 positioned on the spherical shell 1 in the certain direction, so as to move the camera module 3 positioned within the head shell 6 to a corresponding position.

Once receiving a rotation signal, the Mecanum wheels 22 cooperate to drive the chassis 21 to rotate about a straight line, as a rotation axis, that passes through the center of sphere of the spherical shell 1 and a contact point between the spherical shell 1 and a plane where the spherical shell 1 is located, to drive the spherical shell 1 to spin about its center of sphere. While, the connecting arm 24 drives the second magnetic component 25 to rotate about the rotation axis, so that the second magnetic component 25 drives the first magnetic component 4 being in the magnetic connection therewith to rotate, to rotate the head shell 6 positioned on the spherical shell 1 about the rotation axis, so as to drive the camera module 3 positioned within the head shell 6 to rotate about the rotation axis, thereby recording the image round the rotation axis.

Once receiving the rotation signal, the connecting arm 24 rotates relative to the chassis 21, to drive the second magnetic component 25 to rotate. The second magnetic component 25 drives the first magnetic component 4 being in the magnetic connection therewith to rotate, to move the head shell 6, relative to the spherical shell 1, along the outer surface of the spherical shell 1, so as to achieve pitching of the camera module 3 relative to the spherical shell 1, thereby obtaining a greater view angle for the camera module 3.

Therefore, controlling of the spherical robot can be achieved by the spherical shell drive mechanism 2, which achieves adjustments of position and viewing angle of the camera module 3 for recording an image, thereby obtaining good image recording effect of the camera module 3.

Of course, components including the first power module 261, the first controller 262 and the likes of the spherical shell drive mechanism 2 may be served as balance weights 26 fixed to the chassis 21, so that it is ensured that gravity center of an assembly including the spherical shell drive mechanism 2, the head shell 6 and the camera module 3 is lower than the center of sphere of the spherical shell 1 in the vertical direction.

On the basis of provision of the above spherical shell drive mechanism 2, in order to implement a better motion of the head shell 6, specifically, referring to FIG. 1 and FIG. 2, the connecting arm 24 comprises a first connecting rod 242 and a second connecting rod 241.

One end of the first connecting rod 242 is mounted on the chassis 21, and a first driving unit is provided between the first connecting rod 242 and the chassis 21 and is configured to drive motion of the first connecting rod 242. In particular, the first connecting rod 242 may be mounted on the chassis 21 in a pivoting manner.

One end of the second connecting rod 241 is connected to the other end of the first connecting rod 242. In particular, the one end of the second connecting rod 241 may be hinged to the other end of the first connecting rod 242. A second driving unit is provided between the second connecting rod 241 and the first connecting rod 242 and is configured to drive motion of the second connecting rod 241, and the second magnetic component 25 is provided at the other end of the second connecting rod 241.

Figure 4:
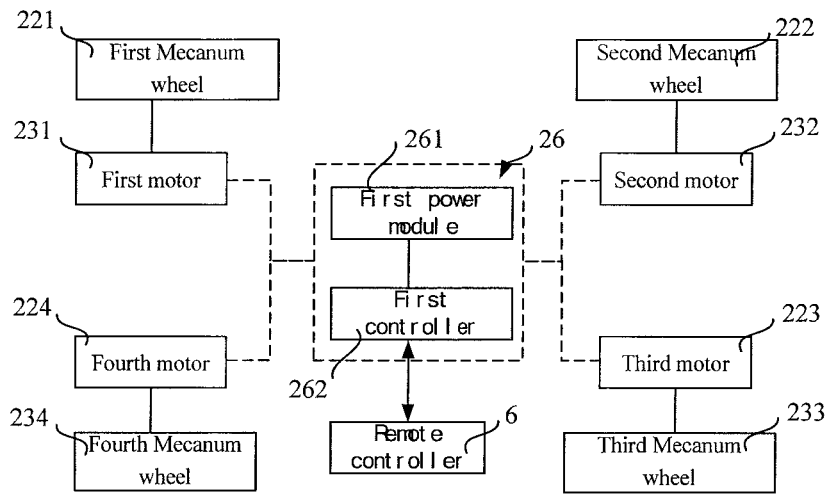
FIG. 4 is a schematic block diagram showing a motion control of a spherical robot according to an embodiment of the present disclosure.

Referring to FIG. 4, the first driving unit and the second driving unit are in signal connections with the first controller 262, and are connected to the first power module 261.

When the first controller 262 sends a motion signal to the first driving unit and the second driving unit according to an operative signal which is sent by the external remote controller and is received by the first controller 262, the first driving unit drives the first connecting rod 242 to rotate relative to the chassis 21, to drive the second connecting rod 241 and the second magnetic component 25 provided on the second connecting rod 241 to move. The second driving unit drives the second connecting rod 241 to move relative to the first connecting rod 242, to drive the second magnetic component 25 provided on the second connecting rod 241 to move. The above two movements of the second magnetic component 25 drive the first magnetic component 4 being in the magnetic connection with the second magnetic component 25 to move, to move the head shell 6 along the outer surface of the spherical shell 1, so as to achieve pitching of the camera module 3 relative to the spherical shell 1, thereby obtaining a greater view angle for the camera module 3.

Specifically, the first driving unit and the second driving unit may be selected in accordance with practical situations. They may be electrical motors, or else may be air cylinders. The following implementation manners are provided for selection. The first driving unit is an electrical motor and the second driving unit is an electrical motor. The first driving unit is an electrical motor and the second driving unit is an air cylinder. The first driving unit is an air cylinder and the second driving unit is an electrical motor. Or, the first driving unit is an air cylinder and the second driving unit is an air cylinder. Suitable implementation manners may be selected according to specific conditions including sizes of the spherical shell 1 and the mechanical arm.

Figure 3:
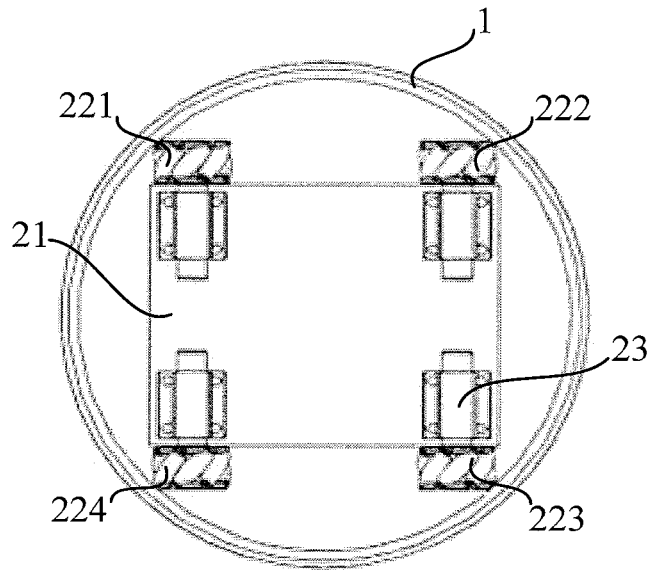
FIG. 3 is a schematic view showing a structure of a spherical shell drive mechanism in the spherical robot according to the embodiment of the present disclosure.

In order to allow the spherical robot to own good stableness during motion, specifically, referring to FIG. 3, the chassis 21 has a quadrilateral structure, and the chassis 21 are provided with four Mecanum wheels 22. In particular, referring to FIG. 3, four corners of the chassis 21 are provided with a first Mecanum wheel 221, a second Mecanum wheel 222, a third Mecanum wheel 223 and a fourth Mecanum wheel 224, respectively; in a forward direction (namely a direction from the bottom to the top on the paper, as shown in FIG. 3) of the spherical robot, the first Mecanum wheel 221 and the fourth Mecanum wheel 224 are located at a left side of the chassis 21, the second Mecanum wheel 222 and the third Mecanum wheel 223 are located at a right side of the chassis 21, the first Mecanum wheel 221 is located in the front of the fourth Mecanum wheel 224, and the second Mecanum wheel 222 is located in the front of the third Mecanum wheel 223; a rotation axis of the first Mecanum wheel 221 is parallel to a rotation axis of the fourth Mecanum wheel 224, and a shaft axis of the second Mecanum wheel 222 is parallel to a shaft axis of the third Mecanum wheel 223; the rotation axis of the first Mecanum wheel 221 is perpendicular to the forward direction of the spherical robot and forms an angle of 5°~15° with respect to a vertical direction; the shaft axis of the second Mecanum wheel 222 is perpendicular to the forward direction of the spherical robot and forms an angle of 5°~15° with respect to the vertical direction; and, a distance between the first Mecanum wheel 221 and the second Mecanum wheel 222 is gradually increased in a vertically downward direction. The spherical shell drive mechanism 2 having the above structure enables wheel axles of the four Mecanum wheels 22 to be in sufficient contact with the inner surface of the spherical shell 1, thereby enhancing stableness of the Mecanum wheels 22 driving the spherical shell 1.

Specifically, each of the Mecanum wheels 22 is connected with the chassis 21 by an electric motor 23 which is in a signal connection with the first controller 262 and is electrically connected to the first power module 261. When the first controller 262 sends a rotation signal or a motion signal to a corresponding Mecanum wheel 22 according to an operative signal which is sent by the external remote controller and is received by the first controller 262, the motor 23, according to the received rotation signal or motion signal and with the support of the power of the first power module 261, drives the Mecanum wheel 22 to implement the motion. A combination of the motions of the plurality of Mecanum wheels 22 enables the spherical shell 1 to rotate about a straight line, as a rotation axis, that passes through the center of sphere of the spherical shell 1 and a contact point between the spherical shell 1 and a plane where the spherical shell 1 is located or to move towards a certain direction.

Figure 6:
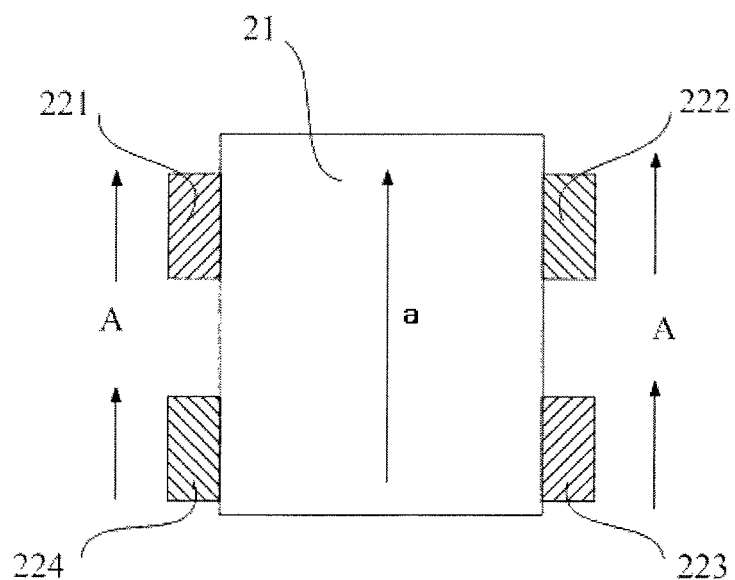
FIG. 6 is a schematic view showing a forward motion of a spherical robot according to an embodiment of the present disclosure.

Referring to FIG. 4 and FIG. 6, with the support of the power of the first power module 261, the first controller 262 sends motion signals to the first electrical motor 231, the second electrical motor 232, the third electrical motor 233 and the fourth electrical motor 234 according to a forward motion signal which is sent by the external remote controller 6 and is received by the first controller 262, to drive the first Mecanum wheel 221, the second Mecanum wheel 222, the third Mecanum wheel 223 and the fourth Mecanum wheel 224 to rotate in the first direction A, so as to move the chassis 21 in a direction a, thereby driving the spherical robot to move forward.

Figure 7:
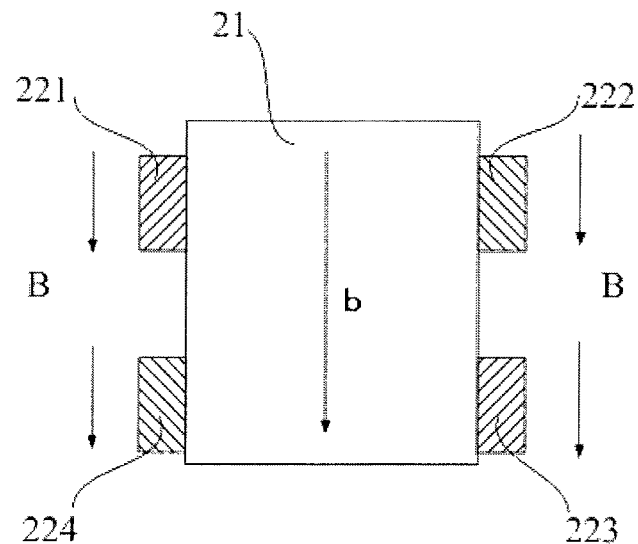
FIG. 7 is a schematic view showing a backward motion of the spherical robot according to the embodiment of the present disclosure.

Referring to FIG. 4 and FIG. 7, with the support of the power of the first power module 261, the first controller 262 sends motion signals to the first electrical motor 231, the second electrical motor 232, the third electrical motor 233 and the fourth electrical motor 234 according to a backward motion signal which is sent by the external remote controller 6 and is received by the first controller 262, to drive the first Mecanum wheel 221, the second Mecanum wheel 222, the third Mecanum wheel 223 and the fourth Mecanum wheel 224 to rotate in the second direction B opposing to the first direction A, so as to move the chassis 21 in a direction b, thereby driving the spherical robot to move backward.

Figure 8:
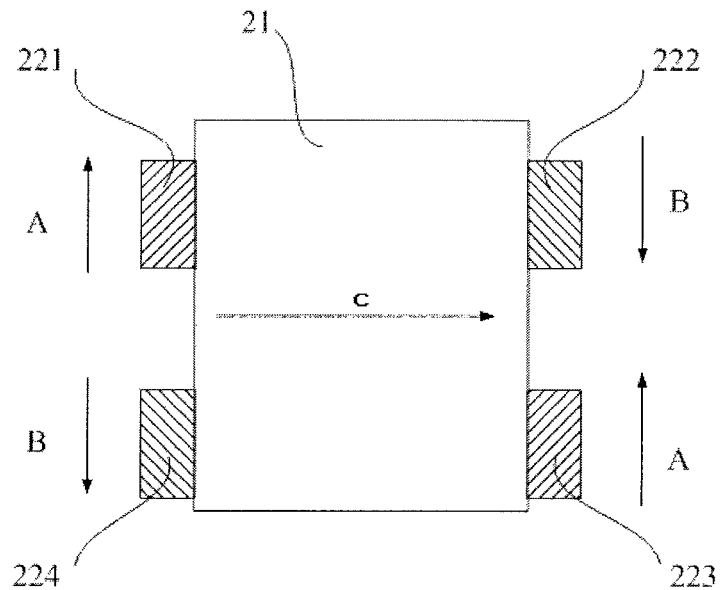
FIG. 8 is a schematic view showing a rightward motion of the spherical robot according to the embodiment of the present disclosure.

Referring to FIG. 4 and FIG. 8, with the support of the power of the first power module 261, the first controller 262 sends motion signals to the first electrical motor 231, the second electrical motor 232, the third electrical motor 233 and the fourth electrical motor 234 according to a rightward motion signal which is sent by the external remote controller 6 and is received by the first controller 262, to drive the first Mecanum wheel 221 and the third Mecanum wheel 223 to rotate in the first direction A and to drive the second Mecanum wheel 222 and the fourth Mecanum wheel 224 to rotate in the second direction B opposing to the first direction A, so as to move the chassis 21 in a direction c, thereby driving the spherical robot to move rightward.

Figure 9:
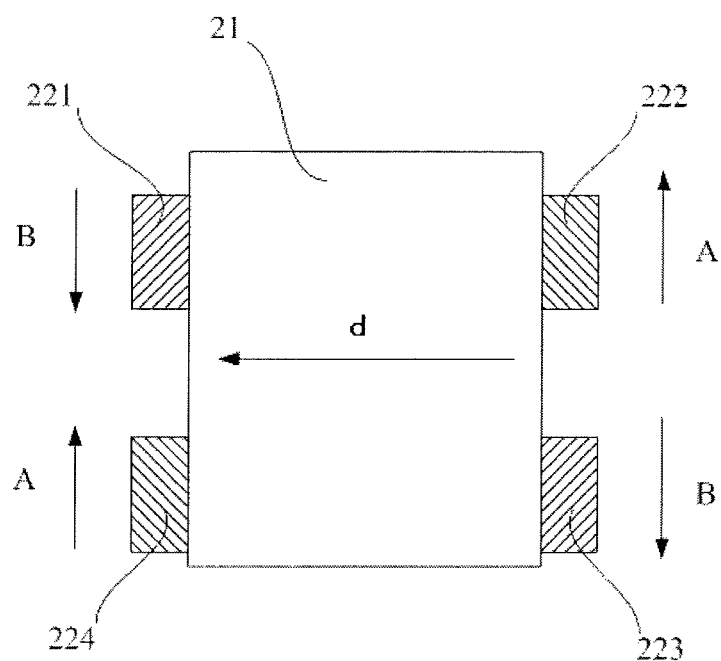
FIG. 9 is a schematic view showing a leftward motion of the spherical robot according to the embodiment of the present disclosure.

Referring to FIG. 4 and FIG. 9, with the support of the power of the first power module 261, the first controller 262 sends motion signals to the first electrical motor 231, the second electrical motor 232, the third electrical motor 233 and the fourth electrical motor 234 according to a leftward motion signal which is sent by the external remote controller 6 and is received by the first controller 262, to drive the first Mecanum wheel 221 and the third Mecanum wheel 223 to rotate in the second direction B opposing to the first direction A and to drive the second Mecanum wheel 222 and the fourth Mecanum wheel 224 to rotate in the first direction A, so as to move the chassis 21 in a direction d, thereby driving the spherical robot to move leftward.

Figure 10:
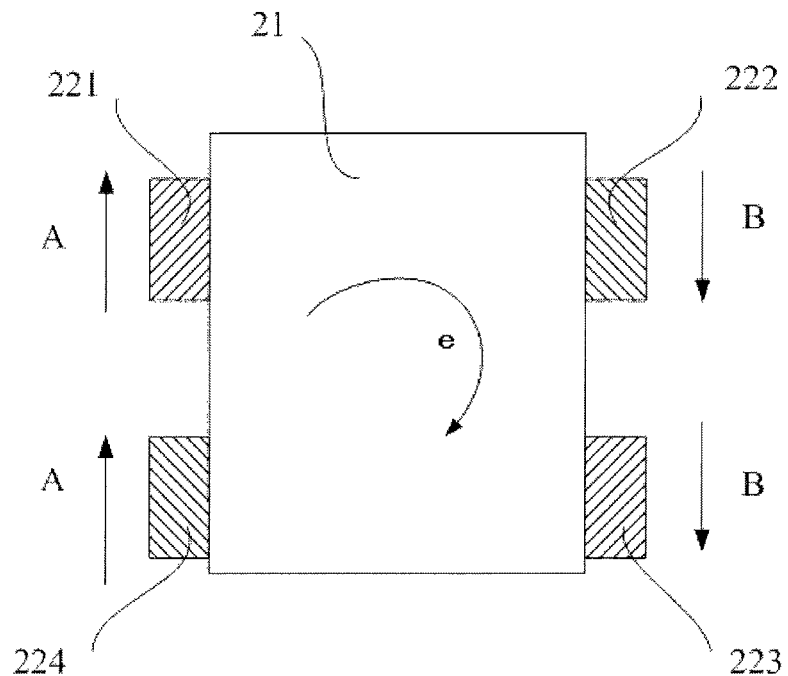
FIG. 10 is a schematic view showing a clockwise rotation of the spherical robot according to the embodiment of the present disclosure.

Referring to FIG. 4 and FIG. 10, with the support of the power of the first power module 261, the first controller 262 sends motion signals to the first electrical motor 231, the second electrical motor 232, the third electrical motor 233 and the fourth electrical motor 234 according to a clockwise rotation signal which is sent by the external remote controller 6 and is received by the first controller 262, to drive the first Mecanum wheel 221 and the fourth Mecanum wheel 224 to rotate in the first direction A, and to drive the second Mecanum wheel 222 and the third Mecanum wheel 223 to rotate in the second direction B opposing to the first direction A, so as to rotate the chassis 21 in a direction e, thereby driving the spherical robot to rotate clockwise.

Figure 11:
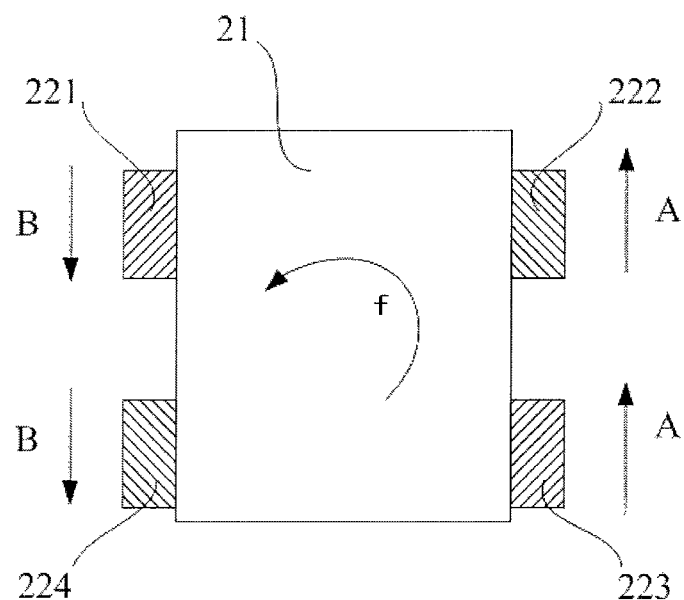
FIG. 11 is a schematic view showing a counterclockwise rotation of the spherical robot according to the embodiment of the present disclosure.

Referring to FIG. 4 and FIG. 11, with the support of the power of the first power module 261, the first controller 262 sends motion signals to the first electrical motor 231, the second electrical motor 232, the third electrical motor 233 and the fourth electrical motor 234 according to a counterclockwise rotation signal which is sent by the external remote controller 6 and is received by the first controller 262, to drive the first Mecanum wheel 221 and the fourth Mecanum wheel 224 to rotate in the second direction B opposing to the first direction A, and to drive the second Mecanum wheel 222 and the third Mecanum wheel 223 to rotate in the first direction A, so as to rotate the chassis 21 in a direction f, thereby driving the spherical robot to rotate counterclockwise.

Figure 12:
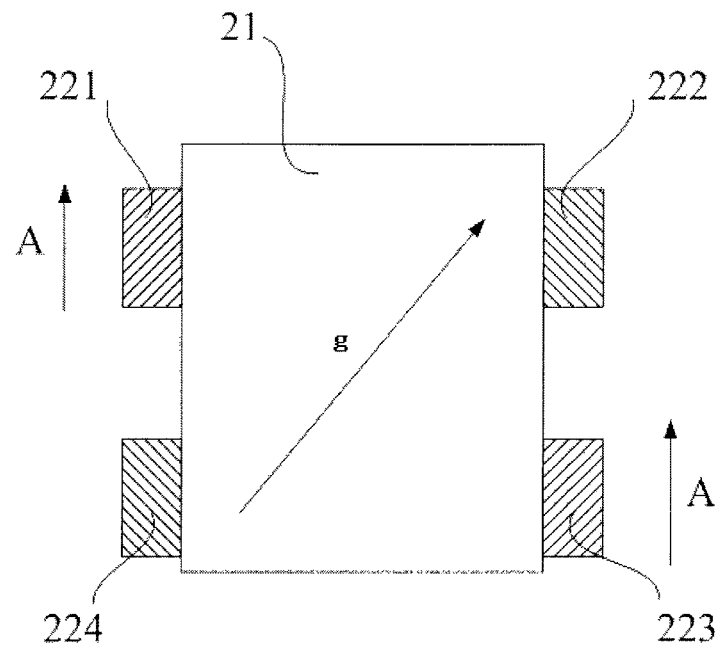
FIG. 12 is a schematic view showing a rightward and forward motion of the spherical robot according to the embodiment of the present disclosure.

Referring to FIG. 4 and FIG. 12, with the support of the power of the first power module 261, the first controller 262 sends motion signals to the first electrical motor 231 and the third electrical motor 233 according to a rightward and forward motion signal which is sent by the external remote controller 6 and is received by the first controller 262, to drive the first Mecanum wheel 221 and the third Mecanum wheel 223 to rotate in the first direction A, so as to rotate the chassis 21 in a direction g, thereby driving the spherical robot to move rightwards and forwards.

Figure 13:
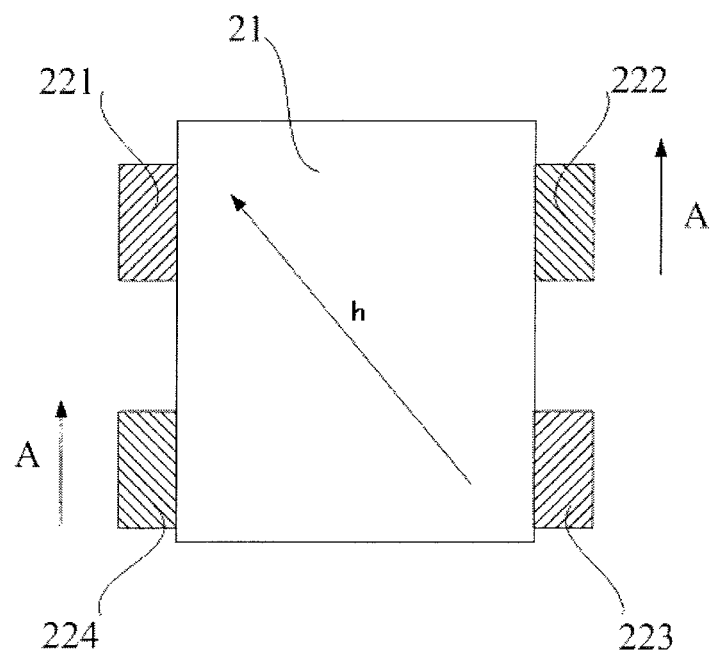
FIG. 13 is a schematic view showing a leftward and forward motion of the spherical robot according to the embodiment of the present disclosure.

Referring to FIG. 4 and FIG. 13, with the support of the power of the first power module 261, the first controller 262 sends motion signals to the second electrical motor 232 and the fourth electrical motor 234 according to a leftward and forward motion signal which is sent by the external remote controller 6 and is received by the first controller 262, to drive the second Mecanum wheel 222 and the fourth Mecanum wheel 224 to rotate in the first direction A, so as to rotate the chassis 21 in a direction h, thereby driving the spherical robot to move leftwards and forwards.

Specifically, the first power module 261 may be a rechargeable battery. As the first power module 261 is enclosed within the spherical shell 1 and is required to provide power support for movement of the spherical robot during the movement, the first power module 261 should be in the form of electric source which is portable and own large capacitance. The rechargeable battery which is cheap in cost, easy to use and powerful in discharging ability meets the requirement. However, the first power module 261 is not limited to the rechargeable battery, and may also be other forms of electric source suitable for the specific spherical robot.

In one embodiment, during sliding of the head shell 6 along the outer surface of the spherical shell 1, when the head shell 6 is pitching relative to the spherical shell 1, an angle between the vertical direction and a connection line between the center of the head shell 6 and the center of sphere of the spherical shell 1 is in the range from 0° to 45°. In order to prevent the head shell 6 from falling from the spherical shell 1, the angle of pitching of the head shell 6 relative to the spherical shell 1 should be in a certain range from 0° to 45°. For example, the angle of depression of the head shell 6 relative to the spherical shell 1 may be 5°, 10°, 15°, 20°, 25°, 30°, 35°, 40°, and 45°, while the angle of elevation of the head shell 6 relative to the spherical shell 1 may be 5°, 10°, 15°, 20°, 25°, 30°, 35°, 40°, and 45°.

In order to achieve a better motion of the head shell 6 on the outer surface of the spherical shell 1, in one embodiment, referring to FIG. 1 and FIG. 2, the head shell 6 is supported on the outer surface of the spherical shell 1 by a plurality of universal wheels 5. When the first magnetic component 4 drives the head shell 6 to move, relative to the spherical shell 1, along the outer surface of the spherical shell 1, the universal wheels 5 of the head shell 6 roll along the outer surface of the spherical shell 1, which enables rotation of the camera module 3 relative to the spherical shell 1, to adjust an view angle of the camera module 3. Since rolling frictions between the universal wheels 5 and the outer surface of the spherical shell 1 are small, the motions of the head shell 6 and the camera module 3 relative to the spherical shell 1 are flexible.

In particular, referring to FIG. 1 and FIG. 2, the head shell 6 is provided with four universal wheels 5 distributed in a quadrangle shape. Provision of the four universal wheels 5 distributed in the quadrangle shape enables the head shell 6 to implement a free motion along an upper half of the outer surface of the spherical shell 1 under the action of the spherical shell drive mechanism 2, thereby enabling the camera module 3 to have a greater view angle.

Figure 14:
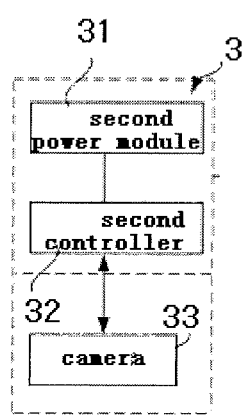
FIG. 14 is a schematic block diagram showing a motion control of a camera module in a spherical robot according to an embodiment of the present disclosure.

In one embodiment, referring to FIG. 14, the camera module 3 comprises a camera 33, a second controller 32 being in a signal connection with the camera 33, and a second power module 31 electrically connected to the camera 33 and the second controller 32 and configured to power the camera 33 and the second controller 32. In an operating process of the camera module 3, the second power module 31 provides a power support to the camera 33 and the second controller 32. The second controller 32 is in a signal connection with an external remote controller, and sends control signals including zooming, wireless data transmission and the like to the camera 33 according to an operative signal sent by the external remote controller. The camera 33 implements corresponding motions according to the received control signals, achieving the controlling of the camera.

Specifically, the second power module may be a rechargeable battery. The rechargeable battery has advantages of cheap in cost, easy to use, powerful in discharging ability, rechargeable ability and the like, and thus can be used as the second power module to provide power support to the camera and the second controller. In addition, the second power module may be other suitable forms of electric source.

Figure 5:
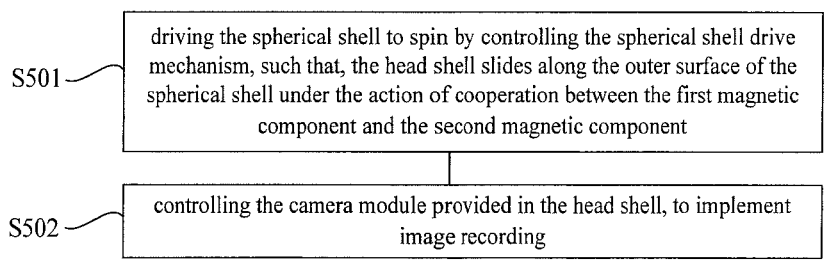
FIG. 5 is a schematic flow diagram showing a method of controlling a spherical robot according to an embodiment of the present disclosure.

Referring to FIG. 5, according to embodiments of the present disclosure, there is provided a method of controlling a spherical robot, and the method comprises:

a step S501 of: driving the spherical shell 1 to spin by controlling the spherical shell drive mechanism 2, such that, the head shell 6 slides along the outer surface of the spherical shell 1 under the action of cooperation between the first magnetic component 4 and the second magnetic component 25; and a step S502 of: controlling the camera module 3 provided in the head shell 6, to implement image recording.

In the method of controlling a spherical robot, in the step S501, the spherical shell drive mechanism 2 drives the spherical shell 1 to spin, and the head shell 6 is always kept at the top of the spherical shell 1 under the action of the first magnetic component 4 and the second magnetic component 25, and the spherical shell 1 drives the head shell 6 to move. When the spherical shell drive mechanism 2 drives the second magnetic component 25 to move, the second magnetic component 25 drives the first magnetic component 4 being in the magnetic connection therewith to rotate, to slide the head shell 6 along the outer surface of the spherical shell 1, so as to achieve a pitching motion of the camera module 3 relative to the spherical shell 1. In the step S502, the camera module 3 provided in the head shell 6 is controlled to implement image recording, so as to achieve image recording of the camera module 3. In the above controlling method, a flexible motion of the camera module 3 can be achieved by simple operation, which achieves high sharpness of the image, great in view angle, good image recording effect of the camera module 3.

In one embodiment, referring to FIG. 3, in a case that, the chassis 21 included in the spherical shell drive mechanism 2 has a quadrilateral structure, and the chassis 21 are provided with four Mecanum wheels 22, that is, in a forward direction (namely a direction from the bottom to the top on the paper, as shown in FIG. 3) of the spherical robot, a first Mecanum wheel 221 and a fourth Mecanum wheel 224 are located at a left side of the chassis 21, a second Mecanum wheel 222 and a third Mecanum wheel 223 are located at a right side of the chassis 21, the first Mecanum wheel 221 is located in the front of the fourth Mecanum wheel 224, and the second Mecanum wheel 222 is located in the front of the third Mecanum wheel 223. In the above step S501, the driving the spherical shell 1 to spin by controlling the spherical shell drive mechanism 2 may specifically comprise the following manners of motion.

Referring to FIG. 6, the spherical robot is driven to move forward when the first Mecanum wheel 221, the second Mecanum wheel 222, the third Mecanum wheel 223 and the fourth Mecanum wheel 224 rotate about their own rotation axes in the first direction A.

Referring to FIG. 7, the spherical robot is driven to move backward when the first Mecanum wheel 221, the second Mecanum wheel 222, the third Mecanum wheel 223 and the fourth Mecanum wheel 224 rotate about their own rotation axes in the second direction B opposing to the first direction A.

Referring to FIG. 8, the spherical robot is driven to move rightward when the first Mecanum wheel 221 and the third Mecanum wheel 223 rotate about their own rotation axes in the first direction A while the second Mecanum wheel 222 and the fourth Mecanum wheel 224 rotate about their own rotation axes in the second direction B.

Referring to FIG. 9, the spherical robot is driven to move leftward when the first Mecanum wheel 221 and the third Mecanum wheel 223 rotate about their own rotation axes in the second direction B while the second Mecanum wheel 222 and the fourth Mecanum wheel 224 rotate about their own rotation axes in the first direction A.

Referring to FIG. 10, the spherical robot is driven to rotate clockwise when the first Mecanum wheel 221 and the fourth Mecanum wheel 224 rotate about their own rotation axes in the first direction A while the second Mecanum wheel 222 and the third Mecanum wheel 223 rotate about their own rotation axes in the second direction B.

Referring to FIG. 11, the spherical robot is driven to rotate counterclockwise when the first Mecanum wheel 221 and the fourth Mecanum wheel 224 rotate about their own rotation axes in the second direction B while the second Mecanum wheel 222 and the third Mecanum wheel 223 rotate about their own rotation axes in the first direction A.

Referring to FIG. 12, the spherical robot is driven to move rightwards and forwards when the first Mecanum wheel 221 and the third Mecanum wheel 223 rotate about their own rotation axes in the first direction A while the second Mecanum wheel 222 and the fourth Mecanum wheel 224 implement no rotation.

Referring to FIG. 13, the spherical robot is driven to move leftwards and forwards when the second Mecanum wheel 222 and the fourth Mecanum wheel 224 rotate about their own rotation axes in the first direction A while the first Mecanum wheel 221 and the third Mecanum wheel 223 implement no rotation.

Cooperation of motions of the four Mecanum wheels 22 provided on the chassis 21 enables omnidirectional motion of the chassis 21, to drive the spherical shell 1 and the head shell 6 to implement corresponding motions. Accordingly, embedment of the spherical shell drive mechanism 2 which is based on Mecanum wheels 22 into interior of the spherical robot can enable controlling of the motion of the spherical robot while keeping good stableness in a fast motion.

In one embodiment, in a case that the spherical shell drive mechanism 2 comprises a chassis 21 and a connecting arm 24 provided on the chassis 21 and including a first connecting rod 242 and a second connecting rod 241, a process of sliding of the head shell 6 along the outer surface of the spherical shell 1 comprises:

driving the head shell 6 to implement a pitching-down motion when the second magnetic component 25 is driven by the first connecting rod 242 and the second connecting rod 241 to move towards a moving direction of the spherical robot; and driving the head shell 6 to implement a pitching-up motion when the first connecting rod 242 and the second connecting rod 241 move towards a direction opposing to the moving direction of the spherical robot.

Cooperation of the movements of the first connecting rod 242 and the second connecting rod 241 enables motion of the head shell 6 along the outer surface of the spherical shell 1, to achieve pitching motion of the head shell 6 and the camera module 3 therein relative to the spherical shell 1, achieving greater view angle of the camera module 3.

It will be apparent for those skilled in the art that various changes and modifications on these embodiments of the present disclosure may be made without departing from the spirit and scope of the present invention. Therefore, the present disclosure intends to include these changes and modifications if these changes and modifications fall into the scope of the present invention, the scope of which is defined in the claims and their equivalents.

What is claimed is:

1. A spherical robot, comprising: a spherical shell, a spherical shell drive mechanism mounted inside the spherical shell to drive the spherical shell to spin about a center of sphere thereof, and a camera module; wherein, the spherical robot further comprises a head shell in which the camera module is mounted, the head shell is located outside the spherical shell and is slideable along an outer surface of the spherical shell; and, the head shell is provided with a first magnetic component, the spherical shell drive mechanism is provided with a second magnetic component, and the first magnetic component is in a magnetic connection with the second magnetic component.

2. The spherical robot of claim 1, wherein, in a vertical direction, a gravity center of an assembly including the spherical shell drive mechanism, the head shell and the camera module is lower than the center of sphere of the spherical shell.

3. The spherical robot of claim 1, wherein, the spherical shell drive mechanism comprises a chassis, a plurality of Mecanum wheels provided on the chassis and rollably fitted with an inner surface of the spherical shell, a first controller configured to control motions of the Mecanum wheels, and a first power module configured to power the Mecanum wheels and the first controller, wherein, the chassis is provided with a connecting arm, and the second magnetic component is provided at one end of the connecting arm.

4. The spherical robot of claim 3, wherein, the connecting arm comprises a first connecting rod and a second connecting rod, wherein:

one end of the first connecting rod is mounted on the chassis, and a first driving unit is provided between the first connecting rod and the chassis and is configured to drive motion of the first connecting rod;

one end of the second connecting rod is connected to the other end of the first connecting rod, a second driving unit is provided between the second connecting rod and the first connecting rod and is configured to drive motion of the second connecting rod relative to the first connecting rod, and the second magnetic component is provided at the other end of the second connecting rod; and the first driving unit and the second driving unit are in signal connections with the first controller, and are connected to the first power module.

5. The spherical robot of claim 4, wherein, the first driving unit is an electric motor, and/or the second driving unit is an electric motor.

6. The spherical robot of claim 3, wherein, the chassis has a quadrilateral structure, four corners of the chassis are provided with a first Mecanum wheel, a second Mecanum wheel, a third Mecanum wheel and a fourth Mecanum wheel, respectively; in a forward direction of the spherical robot, the first Mecanum wheel and the fourth Mecanum wheel are located at a left side of the chassis, the second Mecanum wheel and the third Mecanum wheel are located at a right side of the chassis, the first Mecanum wheel is located in the front of the fourth Mecanum wheel, and the second Mecanum wheel is located in the front of the third Mecanum wheel; a rotation axis of the first Mecanum wheel is parallel to a rotation axis of the fourth Mecanum wheel, and a shaft axis of the second Mecanum wheel is parallel to a shaft axis of the third Mecanum wheel; the rotation axis of the first Mecanum wheel is perpendicular to the forward direction of the spherical robot and forms an angle of 5°~15° with respect to a vertical direction; the shaft axis of the second Mecanum wheel is perpendicular to the forward direction of the spherical robot and forms an angle of 5°~15° with respect to the vertical direction; and, a distance between the first Mecanum wheel and the second Mecanum wheel is gradually increased in a vertically downward direction.

7. The spherical robot of claim 3, wherein, each of the Mecanum wheels is connected with the chassis by an electric motor which is in a signal connection with the first controller and is electrically connected to the first power module.

8. The spherical robot of claim 3, wherein, the first power module is a rechargeable battery.

9. The spherical robot of claim 1, wherein, during sliding of the head shell along the outer surface of the spherical shell, when the head shell is pitching relative to the spherical shell, an angle between a vertical direction and a connection line between a center of the head shell and the center of sphere of the spherical shell is in the range from 0° to 45°.

10. The spherical robot of claim 1, wherein, the head shell is supported on the outer surface of the spherical shell by a plurality of universal wheels.

11. The spherical robot of claim 10, wherein, the head shell is provided with four universal wheels distributed in a quadrangle shape.

12. The spherical robot of claim 1, wherein, the camera module comprises a camera, a second controller being in a signal connection with the camera, and a second power module electrically connected to the camera and the second controller and configured to power the camera and the second controller.

13. The spherical robot of claim 12, wherein, the second power module is a rechargeable battery.

14. A method of controlling the spherical robot of claim 1, the method comprising:
   driving the spherical shell to spin by controlling the spherical shell drive mechanism, such that, the head shell slides along the outer surface of the spherical shell under the action of cooperation between the first magnetic component and the second magnetic component; and
   controlling the camera module provided in the head shell, to implement image recording.

15. The method of claim 14, wherein, in a case that, the chassis has a quadrilateral structure, four corners of the chassis are provided with a first Mecanum wheel, a second Mecanum wheel, a third Mecanum wheel and a fourth Mecanum wheel, respectively, and that in a forward direction of the spherical robot, the first Mecanum wheel and the fourth Mecanum wheel are located at a left side of the chassis, the second Mecanum wheel and the third Mecanum wheel are located at a right side of the chassis, the first Mecanum wheel is located in the front of the fourth Mecanum wheel, and the second Mecanum wheel is located in the front of the third Mecanum wheel, the driving the spherical shell to spin by controlling the spherical shell drive mechanism comprises:
   driving the spherical robot to move forward when the first Mecanum wheel, the second Mecanum wheel, the third Mecanum wheel and the fourth Mecanum wheel rotate about their own rotation axes in a first direction;
   driving the spherical robot to move backward when the first Mecanum wheel, the second Mecanum wheel, the third Mecanum wheel and the fourth Mecanum wheel rotate about their own rotation axes in a second direction opposing to the first direction;
   driving the spherical robot to move rightward when the first Mecanum wheel and the third Mecanum wheel rotate about their own rotation axes in the first direction while the second Mecanum wheel and the fourth Mecanum wheel rotate about their own rotation axes in the second direction;
   driving the spherical robot to move leftward when the first Mecanum wheel and the third Mecanum wheel rotate about their own rotation axes in the second direction while the second Mecanum wheel and the fourth Mecanum wheel rotate about their own rotation axes in the first direction;
   driving the spherical robot to rotate clockwise when the first Mecanum wheel and the fourth Mecanum wheel rotate about their own rotation axes in the first direction while the second Mecanum wheel and the third Mecanum wheel rotate about their own rotation axes in the second direction;
   driving the spherical robot to rotate counterclockwise when the first Mecanum wheel and the fourth Mecanum wheel rotate about their own rotation axes in the second direction while the second Mecanum wheel and the third Mecanum wheel rotate about their own rotation axes in the first direction;
   driving the spherical robot to move rightward and forward when the first Mecanum wheel and the third Mecanum wheel rotate about their own rotation axes in the first direction while the second Mecanum wheel and the fourth Mecanum wheel implement no rotation; and
   driving the spherical robot to move leftward and forward when the second Mecanum wheel and the fourth Mecanum wheel rotate about their own rotation axes in the first direction while the first Mecanum wheel and the third Mecanum wheel implement no rotation.

16. The method of claim 14, wherein, in a case that the spherical shell drive mechanism comprises a chassis and a connecting arm provided on the chassis and including a first connecting rod and a second connecting rod, a process of sliding of the head shell along the outer surface of the spherical shell comprises:
   driving the head shell to implement a pitch-down motion when the second magnetic component is driven by the first connecting rod and the second connecting rod to move towards a moving direction of the spherical robot; and
   driving the head shell to implement a pitch-up motion when the second magnetic component is driven by the first connecting rod and the second connecting rod to move towards a direction opposing to the moving direction of the spherical robot.

* * * * *